United States Patent [19]
Krausse

[11] Patent Number: 4,687,292
[45] Date of Patent: Aug. 18, 1987

[54] LIGHT WAVEGUIDE PLUG CONNECTOR

[75] Inventor: Peter Krausse, Aschheim, Fed. Rep. of Germany

[73] Assignee: Siemens Aktiengesellschaft, Berlin and Munich, Fed. Rep. of Germany

[21] Appl. No.: 723,814

[22] Filed: Apr. 16, 1985

[30] Foreign Application Priority Data

Apr. 18, 1984 [DE] Fed. Rep. of Germany ....... 3414735

[51] Int. Cl.⁴ .............................................. G02B 6/38
[52] U.S. Cl. ................................. 350/96.21; 350/96.20
[58] Field of Search ................ 350/96.20, 96.21, 96.22

[56] References Cited

U.S. PATENT DOCUMENTS

| | | | |
|---|---|---|---|
| 4,279,469 | 7/1981 | Forman | 350/96.22 |
| 4,490,007 | 12/1984 | Murata | 350/96.20 X |
| 4,568,145 | 2/1986 | Colin et al. | 350/96.21 X |

FOREIGN PATENT DOCUMENTS

| | | |
|---|---|---|
| 0025013 | 3/1981 | European Pat. Off. |
| 0051507 | 5/1982 | European Pat. Off. |
| 2922705 | 6/1979 | Fed. Rep. of Germany |
| 2741585 | 2/1980 | Fed. Rep. of Germany |
| 2420147 | 10/1979 | France |

Primary Examiner—Eugene R. LaRoche
Assistant Examiner—James C. Lee
Attorney, Agent, or Firm—Hill, Van Santen, Steadman & Simpson

[57] ABSTRACT

A light waveguide plug connector having a plug sleeve receiving plug pins from opposite ends to form a connection characterized by the plug sleeve being provided with elements to enable securing the connector to a supporting frame and each of the plug pins being provided with elements that enable either guiding the plug pin as it is inserted into the plug sleeve, securing the plug pin in an aperture of a partition or wall or securing the plug pin to the plug sleeve.

11 Claims, 6 Drawing Figures

LIGHT WAVEGUIDE PLUG CONNECTOR

BACKGROUND OF THE INVENTION

The present invention is directed to a light waveguide plug connector comprising a plug sleeve receiving a metal plug pin from each end. Each of the plug pins has a capillary bore receiving a light waveguide fiber with the end of the fiber being flush with the end of the plug pin. The plug sleeve is composed of a hard metal and has a bore with an inside surface precisely matching the outside surface of the two plug pins so that the fibers of the two plug pins are axially aligned in abutting relationship when the plug pins are inserted into opposite ends of the plug sleeve.

Plug pins, which have a metal pin with a bore receiving a light waveguide fiber, are known and, for example, are disclosed in German AS No. 27 41 585. In addition, plug sockets or sleeves for receiving plug pins are known from European No. LP 00 25 013.

SUMMARY OF THE INVENTION

The object of the present invention is to produce a releasable connection between two light waveguide cables via largely identically fashioned plug pins which can be universally suitable for use with a supporting frame, measuring purposes and other arbitrary connections.

To accomplish these goals, the present invention is directed to an improvement in a light waveguide plug connector having a plug sleeve receiving a metal plug pin at each of its ends, each of said plug pins having a pin with a capillary bore receiving a light waveguide fiber with an end of the fiber being flush with the end of the pin, said plug sleeve being composed of a hard metal and having a bore with an inside surface precisely matched to the outside surface of each of the two plug pins so that when the two plug pins are inserted into the ends of the plug sleeve, the fibers are axially aligned in an abutting connection. The improvements are that the plug sleeve has securing means for fastening the plug sleeve to a wall of a supporting structure, said securing means including an outer sleeve member to provide means for protecting the plug pin and for transferring the forces between the plug sleeve and the plug pins, and each of the plug pins having means for aiding in the connection of the plug pins to the plug sleeve. The means for aiding can include one or more of the following elements: a guide sleeve or element, a protective sleeve, a combination guide and protective sleeve, threaded means for securing such as an external thread on a fastening part or internal thread on a tubular sleeve mounted on a plug socket.

In addition, the improved light waveguide connector can have a plug pin utilized with a plug sleeve for connection to an identical plug pin or can be connected through a modified plug sleeve to a plug pin provided with a fastening part with a guidance sleeve. Thus, both connections between two plug pins as well as a connection of the two plug pins to a plug sleeve mounted in an aperture of a wall or partition can occur. In addition, the plug pin can be connected to a modified plug sleeve which receives a modified plug pin which is mounted on a wall or a partition of a movable member while the plug sleeve can be mounted in an aperture of a supporting frame.

Other modifications and objects will be apparent from a review of the drawings and the following specification and claims.

DESCRIPTION OF THE PREFERRED EMBODIMENTS

Figure 1:
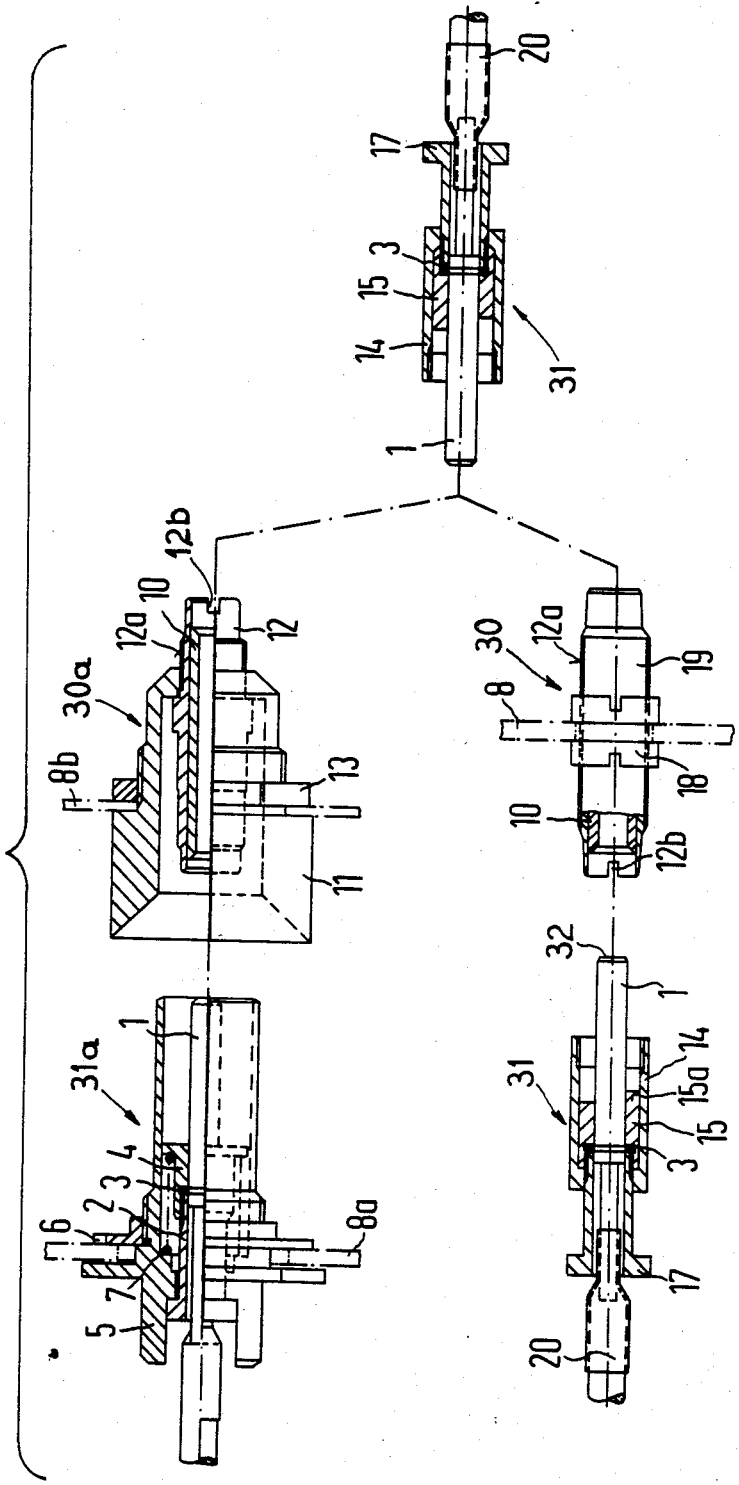
FIG. 1 is an exploded view with portions in cross-section for purposes of illustration of a plug pin of the present invention being utilized with one plug sleeve for connection to an identical plug pin or being utilized with a modified plug sleeve for connecting to a modified plug pin.

The principles of the present invention are particularly useful in a plug connector for forming a plug connection for waveguides utilizing a plug sleeve generally illustrated at 30 in FIG. 1 for connecting identical plug pins generally indicated at 31 in an abutting relationship. In addition, the invention can utilize a modified plug sleeve generally indicated at 30a for connecting a standard plug pin 31 to a modified plug pin 31a.

Each of the plug pins 31 and 31a utilize a metal pin 1 which has an axially extending bore to receive an optical or light waveguide fiber of a light waveguide cable 20. Each of the pins 1 have a planar end surface 32 which has been polished with the fiber mounted in the bore of the pin so that the end of the fiber is polished flush with the planar end surface 32.

Each of the plug sleeves 30 and 30a have a common guide sleeve, sleeve member or bushing 10, which receives the pins 1 from opposite ends. The sleeve member or bushing 10 is formed of a hard metal and has an inner surface which is precisely matched to the outer surfaces of the pins 1 so that the optical fibers of each of the pins 1 are axially aligned when the pins enter opposite ends of the sleeve 10.

The plug sleeve 30 as illustrated in a lower part of FIG. 1 forms a direct connection between two plug pins 31. The plug sleeve 30 is provided with a protective sleeve or outer tubular layer 19, which is neutrally designed and is provided with outside threads 12a that extend the overall length. The threads 12a when forming a connection between two plug pins 31 receive threaded sleeves or tubular members 14 that form compression nuts to hold each of the plug pins 31 on the plug sleeve 30. If it is desired to mount the plug sleeve 30 in an aperture of a partition such as 8 illustrated in broken lines, a pair of ring nuts 18 are threaded on the outside threads 12a to lock the sleeve in the desired position.

Figure 3:
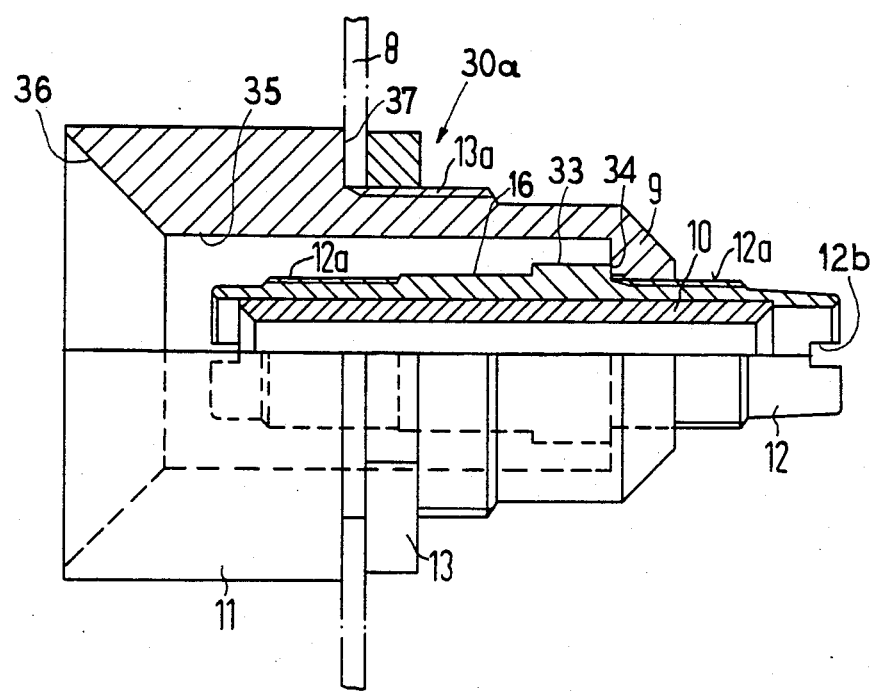
FIG. 3 is an enlarged partial cross-sectional view of the modified plug sleeve in accordance with the present invention.

A modification of the plug sleeve is illustrated by the plug sleeve 30a in FIGS. 1 and 3. As illustrated in FIG. 3, the modified plug sleeve 30a has the guide sleeve or bushing 10 which is provided with an outer sleeve 12 which has outer threads 12a adjacent each end with the center portion being smooth at 16 and another center portion 33 forming a shoulder 34. The outer sleeve 12 telescopically receives the guide sleeve or bushing 10 and is preferably glued by means of a suitable capillary glue. Thus, the outside surface of the guide sleeve 10 should be matched and mated to the inside surface of the outer sleeve 12 in such a manner that no stress will be applied by the outer sleeve 12 to the precisely formed guide sleeve 10.

Figure 5:
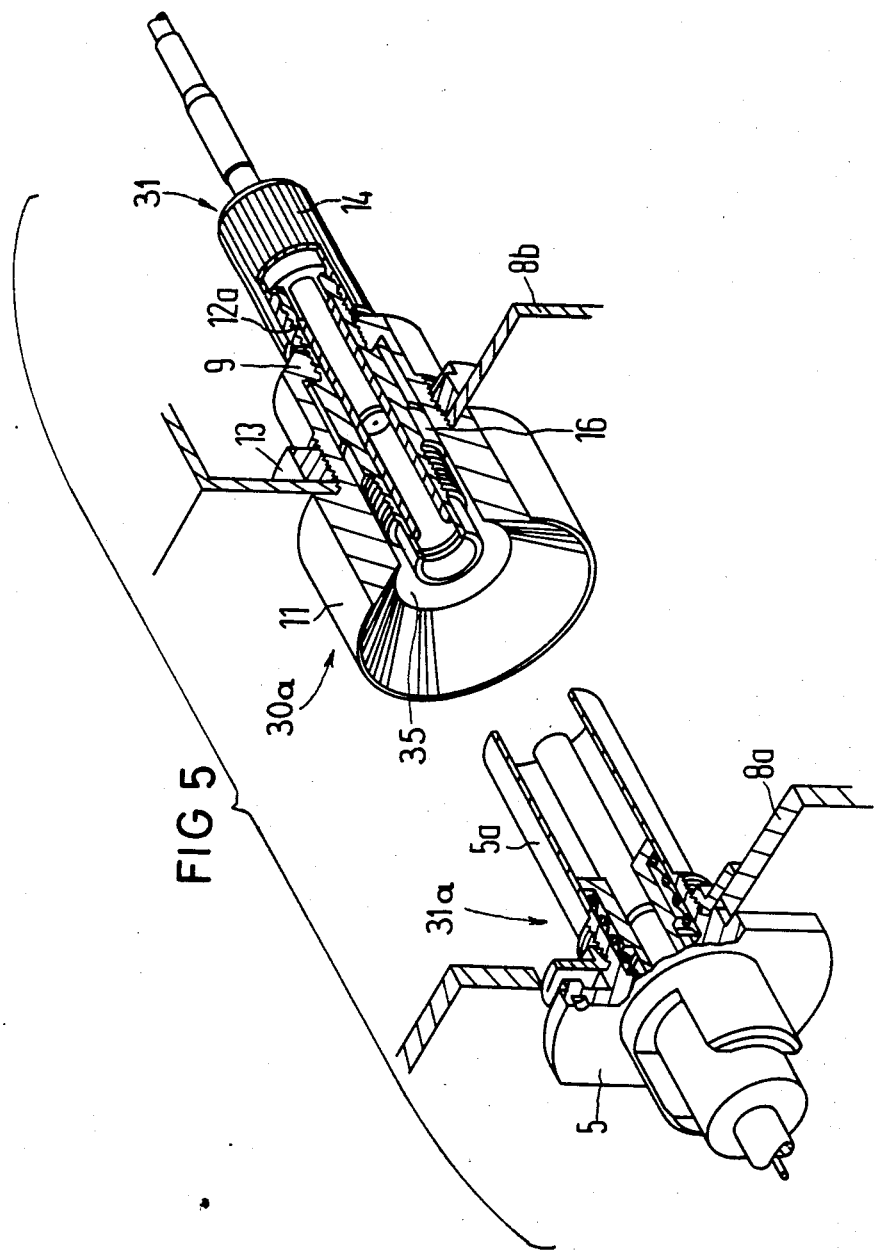
FIG. 5 is a perspective view with portions in cross-section for purposes of illustration of the modified plug sleeve receiving the standard plug sleeve and being ready for receiving the modified plug pin from the opposite end.

A funnel-shaped member or socket 11 is mounted on the outer sleeve 12 and at one end has a collar 9 threadably received on the outer threads 12a adjacent one end of the sleeve 12. As illustrated, the collar 9 is threaded to a point to engage the shoulder 34. The sleeve 11 from the collar 9 to the opposite end has an enlarged diameter bore 35 terminating in a diverging taper 36. The sleeve is also provided with an outer or external shoulder 37 adjacent outer threads 13a which outer shoulder 37 coacts with a ring nut 13 to mount the funnel-shaped sleeve 11 in an aperture of a partition or wall such as the wall 8 of FIG. 3 or a supporting frame or wall 8b of FIG. 5. The diverging portion 36 leading into the enlarged bore 35 of the member 11 acts to precenter a plug pin such as 31a as best illustrated in FIG. 5. This is particularly essential when the plug pin 31a is mounted on a wall of an insertable member such as a wall 8a (FIG. 5).

Figure 4:
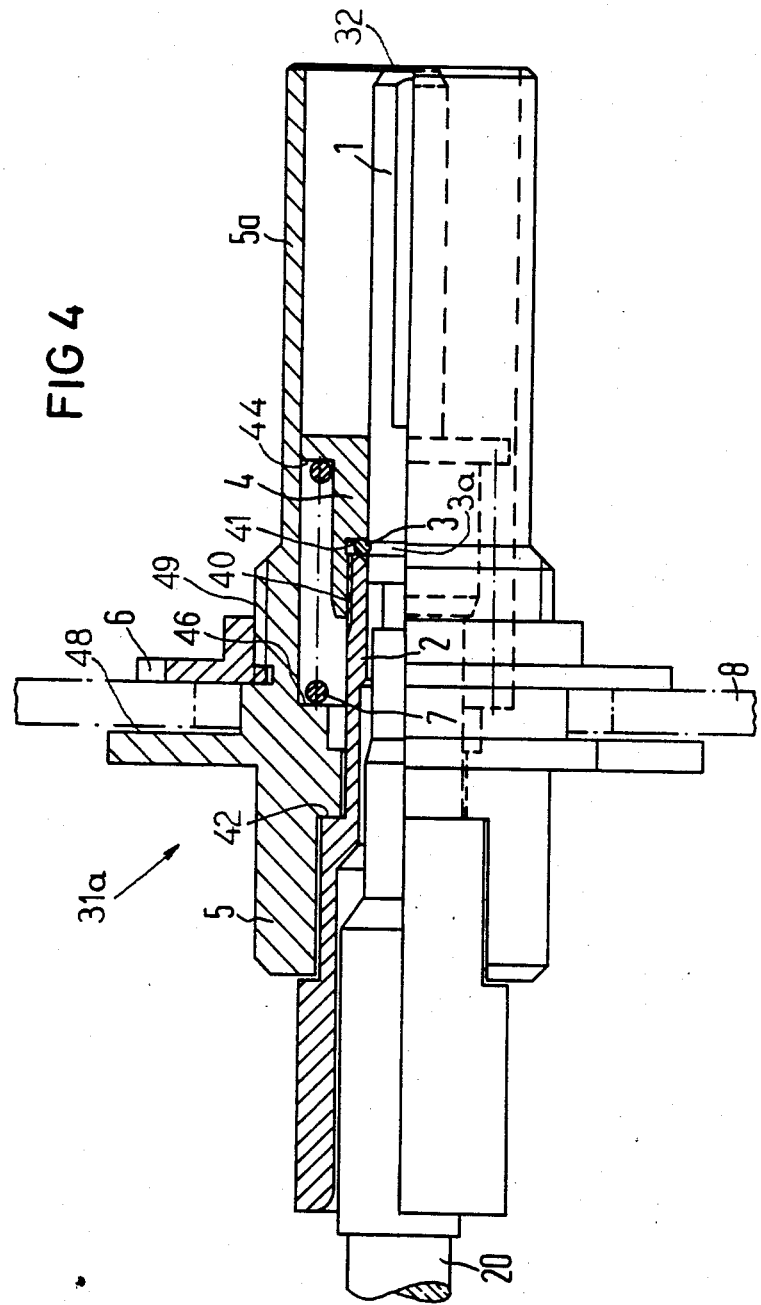
FIG. 4 is an enlarged partial cross-sectional view of a modified plug pin in accordance with the present invention.

The modified plug pin 31a is best illustrated in FIG. 4 and includes not only the pin 1 which is connected to an end of a flexible light waveguide 20, but also includes a sleeve or part 2 which slips over the pin 1 and has a portion receiving an end of the pin 1 opposite the end surface 32. The sleeve 2 adjacent one end is provided with exterior threads 40 which threadably receive a coupling sleeve or part 4. Between the end of the sleeve 2 and an internal shoulder 41 of the coupling sleeve 4, a spring washer or element 3 is entrapped and forced into a groove such as 3a in the pin 1 to interconnect the pin 1 and the parts 2 and 4 together.

The sleeve 2 at a position removed from the end having the threads 40 has an external shoulder 42. In addition, the coupling sleeve 4 has a shoulder 44. A fastening part or coupling socket 5 for connecting the plug pin 31a in an aperture of a partition or wall 8 has an internal shoulder 46 which receives one end of a spring element 7, which spring element is entrapped between the shoulder 46 and the shoulder 44 of the coupling sleeve 4. As illustrated, the spring urges the combination of the pin 1 and the sleeves 2 and 4 to a position where the shoulder 42 abuts against an internal shoulder of the fastening part or coupling socket 5. The coupling socket 5 also has an external shoulder 48 which engages the surface of the partition such as 8 and external threads 49 which receive a ring nut 6. Coaction between the nut 6 and the shoulder 42 securely fasten the socket 5 in the aperture of the partition 8. Due to the spring 7, when the front end 32 of the pin 1 engages the front end 32 of the opposite pin, the pin 1 of the plug pin 31a can shift axially to compensate for any axial tolerances. In addition to the other elements, the fastening socket or part 5 has a protective sleeve or tubular extension 5a which surrounds the pin 1. As best illustrated in FIG. 5, the protective sleeve 5a will slide into the bore 35 of the member 11 and guide the plug sleeve 31a as the pin 1 is inserted in the sleeve or bushing 10. The sleeve 5a will engage the outer smooth portion 16 of the element 12 and as mentioned hereinabove, the pin 1 of the plug pin 31a can yield when its end engages the pin 1 of the plug pin 31.

Figure 2:
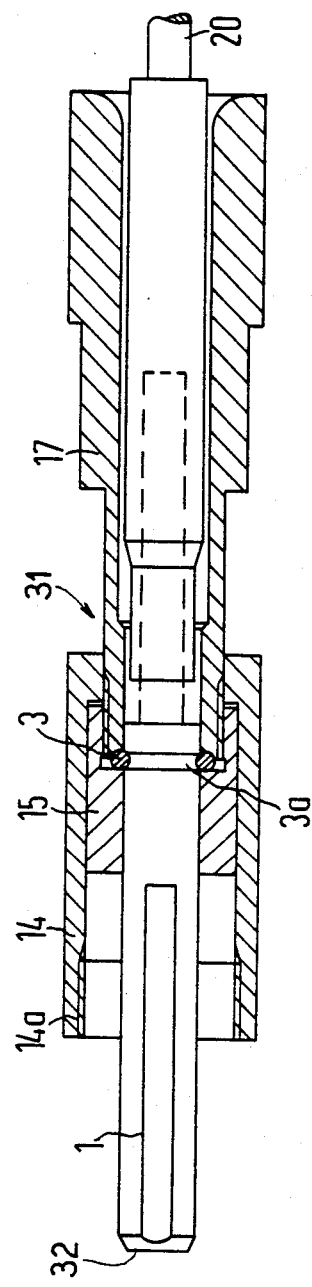
FIG. 2 is a cross-sectional view of one embodiment of a plug pin in accordance with the present invention.

The plug pin 31 is best illustrated in FIG. 2 and has the pin 1 connected to the end of a light waveguide cable 20. A plug sleeve or socket 17 is telescoped over the light waveguide cable 20 and has a threaded end for receiving threads of a fastening sleeve 15. As in the previously discussed embodiment, a spring washer or member 3 is inserted between an internal shoulder of the fastening socket 15 and the end of the sleeve 17 and as the two are threaded together the member 3 is forced into a annular groove 3a on the pin 1 to lock the pin 1, the sleeve or socket 15 and the sleeve 17 together. A coupling sleeve or tubular sleeve 14 is rotatably mounted on an outer surface of the sleeve 17 and held thereon by the fastening socket 15. The coupling sleeve has internal threads 14a which are threadably received on the outer threads 12a of the protective or outer sleeve 19 of the plug sleeve 30 or on the threads 12a of the outer sleeve 12 of the plug sleeve 30a.

To prevent twisting between the plug pin 31 and the plug sleeve 30, the coupling element or part 15 can be provided with a nose or projection 15a (see FIG. 1) which is received in a slot or recess 12b in the sleeve 19 or a slot or recess 12b in the sleeve 12. When engaged in the slot 12b, relative rotation between the plug sleeve 30 and the majority of the parts of the plug pin 31 are prevented.

Figure 6:
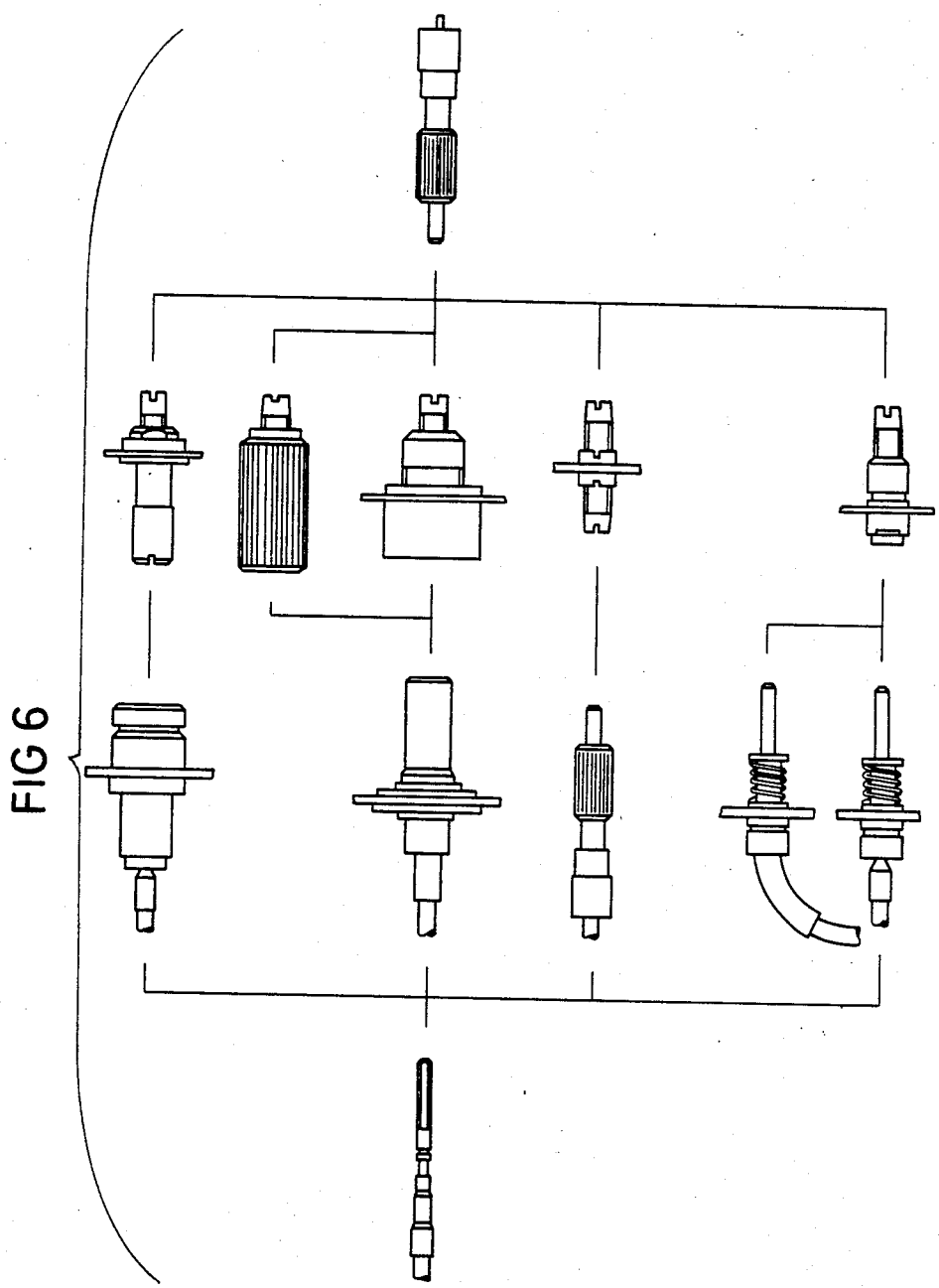
FIG. 6 is a schematic presentation illustrating the versatility of the pin for the plug pin with various plug pin designs used with various plug sleeve designs for connecting to a plug pin in accordance with the present invention.

As is apparent from the above description, the plug pin 31 can be used with different plug sleeves 30 and 30a depending on the type of connection. The family of plug connectors and the versatility of the parts of the plug connector of the present invention are schematically illustrated in FIG. 6. It is noted that the outside diameter of the parts such as 5, 11 and 19 can be selected such that they can be fastened in the same passage or aperture in a supporting frame or insert respectively instead of a coaxial connector.

By changing the parts around the hard metal pins and bushings or sleeves, it is also possible to create an optimally designed and functionally suited plug connector for any type of use. The plug connector according to the present invention with the screw connection is optionally designed with or without antitwist protection and all demands for a standardized format can thus be met with this family of plug connector parts.

Although various minor modifications may be suggested by those versed in the art, it should be understood that I wish to embody within the scope of the patent granted hereon, all such modifications as reasonably and properly come within the scope of my contribution to the art.

I claim:

1. In a light waveguide plug connector having a plug sleeve with opposite ends for receiving metal plug pins, each of said plug pins having a pin with an outer surface and a capillary bore receiving a light waveguide fiber with an end of the fiber being flush with an end of the pin, said plug sleeve being composed of a rigid, hard metal bushing having a bore with an inside surface precisely matched to the outer surface of each of the two pins so that when the two plug pins are inserted into the opposite ends of the plug sleeve the fibers are axially aligned in an abutting relationship in the plug sleeve, the improvements comprising the plug sleeve having securing means for fastening the plug sleeve to a wall of a supporting structure, said securing means including an outer sleeve member surrounding the bushing to provide means for protecting the plug pins and for transferring the forces between the plug sleeve and the plug pins, and each of the plug pins having means for aiding in the connection of the plug pins to the plug sleeve.

2. In a light waveguide plug connector according to claim 1, wherein the means for aiding include thread means for securing the plug pin to another member.

3. In a light waveguide plug connector according to claim 2, wherein the plug pin has a plug socket concentrically receiving the pin of the plug pin, said plug socket having a tubular sleeve, said thread means being provided on said sleeve and enabling the securing of the plug pin to the plug sleeve of the connector.

4. In a light waveguide plug connector according to claim 2, wherein the thread means enables mounting the plug pin in an aperture of a partition.

5. In a light waveguide plug connector according to claim 4, wherein the plug pin has a fastening part and resilient means for mounting the pin in the part and enabling axial movement of the pin in said part, said fastening part being provided with the thread means on an external surface for receiving a nut for securing the plug pin in the aperture of a partition.

6. In a light waveguide plug connector according to claim 5, wherein the resilient means includes a spring action between an annular shoulder of the pin and an internal annular shoulder of the fastening part.

7. In a light waveguide plug connector according to claim 5, wherein the fastening part has a protective sleeve extending from one end and surrounding the pin of the plug pin.

8. In a light waveguide plug connector according to claim 1, wherein said securing means comprises external threads on a portion of the plug sleeve, said threads receiving annular nuts for securing the plug sleeve in an aperture of a partition.

9. In a light waveguide plug connector according to claim 1, wherein the securing means for the plug sleeve include a funnel-shaped member secured on an outer surface of the sleeve member of the plug sleeve, said funnel-shaped member having external threads extending from an external shoulder for receiving a threaded nut to secure the plug sleeve in an aperture in a partition, and said funnel-shaped member having an inner bore providing a guidance surface for engaging a guiding element of a plug pin being inserted therein.

10. In a light waveguide plug connector according to claim 9, wherein the guiding element is a tubular sleeve surrounding the pin of the plug pin and being received in the bore of the funnel-shaped member to guide the plug pin as the pin is inserted in the bushing of the plug sleeve.

11. In a light waveguide plug connector according to claim 7, wherein the plug sleeve has a funnel-shaped member having a bore with a threaded portion receiving the sleeve member of the plug sleeve, said bore having an enlarged portion with a diverging end portion for receiving the protective sleeve of the fastening part to guide the plug pin as the pin is inserted into the sleeve member of the plug sleeve.

* * * * *